(12) United States Patent
Humbert et al.

(10) Patent No.: US 9,422,170 B2
(45) Date of Patent: Aug. 23, 2016

(54) METHOD FOR PRODUCING POTABLE WATER AND/OR PURIFYING WATER INCLUDING THE ELIMINATION OF A TARGET COMPOUND AND FILTRATION WITHIN A FILTER DRUM

(75) Inventors: Hugues Humbert, Claye Souilly (FR); Philippe Breant, Neauphle le Chateau (FR); Pierre Girodet, Le Perreux sur Marne (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 1051 days.

(21) Appl. No.: 13/516,041

(22) PCT Filed: Dec. 16, 2010

(86) PCT No.: PCT/EP2010/069952
§ 371 (c)(1),
(2), (4) Date: Jul. 30, 2012

(87) PCT Pub. No.: WO2011/073335
PCT Pub. Date: Jun. 23, 2011

(65) Prior Publication Data
US 2012/0285888 A1 Nov. 15, 2012

(30) Foreign Application Priority Data
Dec. 17, 2009 (FR) .................................. 09 59091

(51) Int. Cl.
*B01D 61/00* (2006.01)
*B01D 17/12* (2006.01)
(Continued)

(52) U.S. Cl.
CPC ................ *C02F 1/283* (2013.01); *B01D 41/02* (2013.01); *B01J 20/20* (2013.01);
(Continued)

(58) Field of Classification Search
CPC .. B01D 17/047; B01D 33/15; B01D 2321/04; B01D 41/02; B01D 63/16; B01D 61/14; B01D 61/145; C02F 11/126; C02F 11/27; C02F 2303/16; B01J 49/00
USPC ........................................................ 210/651
See application file for complete search history.

(56) References Cited

U.S. PATENT DOCUMENTS 4,569,756 A * 2/1986 Klein ..................... B01D 37/02
210/193
5,069,795 A * 12/1991 Romey .................... C02F 1/283
210/652

(Continued)

FOREIGN PATENT DOCUMENTS

DE 102007045269 A1 4/2009
GB 812943 A 5/1959
(Continued)

*Primary Examiner* — Ana Fortuna
(74) *Attorney, Agent, or Firm* — Coats and Bennett PLLC (57) ABSTRACT

The invention relates to a method for treating water laden with pollutants for the purpose of making the water drinkable, said method including: an elimination step consisting of contacting said water laden with pollutants, within a stirred contact tank (2), with an active particulate material (19) using a predetermined concentration of the active particulate material (19) in said water; an extraction step consisting of continuously extracting from said contact tank (2) a mixture consisting of water and of active particulate material (19); a separation step consisting of continuously separating said active particulate material (19) from said mixture. According to the invention, the separation step consists in particular of feeding the mixture of water and active particulate material into a filter drum (4).

19 Claims, 2 Drawing Sheets

(51) Int. Cl.

| | | |
|---|---|---|
| *B01D 24/00* | (2006.01) | |
| *B01J 49/00* | (2006.01) | |
| *C02F 1/44* | (2006.01) | |
| *C02F 1/28* | (2006.01) | |
| *B01D 41/02* | (2006.01) | |
| *B01J 20/20* | (2006.01) | |
| *C02F 1/42* | (2006.01) | |
| *B01J 20/34* | (2006.01) | |
| *B01J 20/28* | (2006.01) | |
| *C02F 1/00* | (2006.01) | |

(52) U.S. Cl.
CPC ....... *B01J 20/28004* (2013.01); *B01J 20/3416* (2013.01); *B01J 49/00* (2013.01); *C02F 1/42* (2013.01); *C02F 1/001* (2013.01); *C02F 1/008* (2013.01); *C02F 1/444* (2013.01); *C02F 2209/42* (2013.01); *C02F 2209/44* (2013.01); *C02F 2303/16* (2013.01)

(56) References Cited

U.S. PATENT DOCUMENTS

| | | | | |
|---|---|---|---|---|
| 5,082,570 | A * | 1/1992 | Higgins | C02F 1/281 210/660 |
| 6,001,258 | A * | 12/1999 | Sluys | B01D 15/00 210/650 |
| 6,348,153 | B1 * | 2/2002 | Patterson | B01D 59/12 210/638 |
| 7,027,884 | B2 * | 4/2006 | Watanabe | G05B 19/41865 700/106 |
| 7,172,701 | B2 * | 2/2007 | Gaid | C02F 9/00 210/151 |
| 7,291,271 | B2 * | 11/2007 | Galbraith | B01J 20/3441 165/104.15 |
| 7,678,278 | B2 * | 3/2010 | Binot | C02F 1/283 210/661 |
| 7,763,666 | B2 * | 7/2010 | Vero | B01J 49/0004 521/26 |
| 2006/0011550 | A1 | 1/2006 | Bourke et al. | |
| 2007/0039895 | A1 * | 2/2007 | Sengupta et al. | 210/723 |
| 2008/0047902 | A1 * | 2/2008 | Beswick | C02F 1/288 210/688 |
| 2008/0245739 | A1 * | 10/2008 | Honji | B01J 20/3441 210/670 |
| 2011/0132839 | A1 * | 6/2011 | Zuback et al. | 210/638 |
| 2012/0152819 | A1 * | 6/2012 | Cho | B01D 29/15 210/393 |
| 2012/0205313 | A1 * | 8/2012 | Sathrugnan et al. | 210/652 |
| 2012/0285888 | A1 * | 11/2012 | Humbert et al. | 210/636 |
| 2015/0048024 | A1 * | 2/2015 | Grelot et al. | 210/608 |

FOREIGN PATENT DOCUMENTS

| | | |
|---|---|---|
| JP | 4066182 A | 3/1992 |
| JP | 11244851 A | 9/1999 |
| WO | 91/04791 A1 | 4/1991 |

* cited by examiner

METHOD FOR PRODUCING POTABLE WATER AND/OR PURIFYING WATER INCLUDING THE ELIMINATION OF A TARGET COMPOUND AND FILTRATION WITHIN A FILTER DRUM

This application is a U.S. National Stage Application of PCT Application No. PCT/EP2010/069952, with an international filing date of 16 Dec. 2010. Applicant claims priority based on French Patent Application No. 0959091 filed 17 Dec. 2009. The subject matter of these application is incorporated herein.

1. FIELD OF THE INVENTION

The field of the invention is that of methods for treating water with a view to purifying it and/or making it potable or drinkable.

The invention concerns especially the purification of any kind of water (urban wastewater, industrial wastewater) and/or the potabilizing of any type of water (surface freshwater or ground freshwater, treated urban wastewater, industrial wastewater, sea water, etc.) containing any type of pollutant (organic matter of natural origin, organic micropollutants such as for example pesticides, micropollutants such as for example bromates, chemical pollutants etc.).

2. PRIOR ART AND DRAWBACKS OF THE PRIOR ART

Water treatment methods are commonly used especially in order to produce potable water.

These methods, also called potabilization methods, generally comprises a step of elimination in which the water to be treated is put into contact with an active particulate material in a stirred tank. This step of elimination is necessarily followed by a step of separation during which the active particulate material is separated from the mixture of water and active particulate material, and treated water is collected. The active particulate material is then rerouted into the stirred tank. The collected treated water is, as the case may be, conveyed towards filtering units placed downstream in order to reduce its residual turbidity.

There is a known technique for producing drinking water wherein the elimination step implements PAC (powder activated carbon). In this case, the separation of the PAC and of the treated water is obtained by decantation. This presupposes the prior injection of a polymer into the mixture of PAC and water so as to ballast or weigh down the PAC and facilitate its decantation.

There is another known technique for potabilizing that is described in the international patent application WO-A1-96/07615, in which the elimination step implements magnetic ion-exchange resins ballasted or settled by metal oxides. In this case, the separation of the resins, of a part of the fines resulting from the attrition of the resins and of the treated water is obtained by decantation. The remainder of the fines that has not been separated by decantation is subsequently recovered by magnetization.

The decantation implemented in these techniques is influenced by numerous parameters (temperature, flow-rate variations, etc) even further complicating the control of this separation step. In addition, this separation technique has the drawback of not permitting a separation as absolute and speedy as that of a physical barrier, such as is formed by a screen. Consequently, the decantation may possibly give rise to a loss of active particulate material and of the initially added reagents.

These possible losses of active particulate matter and, as the case may be, of polymer play a part, inter alia, in augmenting the rapidity of clogging of the filtering units placed downstream.

The international patent application WO-A1-96/07615 teaches the possibility of implementing a screen so as to separate the ion-exchange resins from the mixture of treated water and resins. It is true that this technique makes it possible to limit the losses of active particulate material in the treated waters. However, it entails particular constraints in being implemented. It presupposes indeed that the screen, which gets rapidly clogged, will be regularly cleaned. These cleaning operations dictate the stopping of the production of treated water, and this reduces productivity and increases operating costs.

The Japanese patent applicant JP-A-55157333 describes a technique that prevents the leakage of active particulate material in the treated water. This technique consists of introducing water for treatment into a tank. A lower part of a porous rotating cylinder containing ion-exchange resins effects a paddling action in this tank. The water to be treated enters the cylinder, comes into contact with the ion-exchange ions that are housed therein, then comes out of the cylinder and is collected, while the ion-exchange resins remain inside the cylinder. The ion-exchange ions are extracted continuously from the cylinder in order to be regenerated and then again introduced continuously into the cylinder.

This technique has the advantage of preventing the leakage of ion-exchange resins into the treated water and cancels out the drawbacks resulting therefrom (such as clogging of downstream filtering units, excess operating costs related to the use of fresh or regenerated active particulate material to compensate for the losses, etc.).

This technique however has the drawback of limiting the efficiency of the contact between the water to be treated and the ion-exchange resins because of an unsatisfactory stirring of the active, particulate material within the cylinder. This induces relatively lengthy treatment times. Increasing the speed of rotation of the cylinder could enable improvement of the contact between the water to be treated and the ion-exchange resins. The ion-exchange resins are however subject to the attrition phenomenon. In other words, these resins tend to get gradually used up when they are subjected to friction. Increasing the speed of rotation of the cylinder would therefore prompt a speedy deterioration of the resins.

3. GOALS OF THE INVENTION

The invention is aimed especially at mitigating these drawbacks of the prior art.

More specifically, it is a goal of the invention to provide a technique for potabilizing that includes at least one step for putting the water to be treated in contact with an active particulate material and a step for separating the active particulate material from a mixture of active particulate material and water, which makes it possible to both maximize the contact between the active particulate material and the water to be treated and prevent the losses of active particulate material in the treated water.

In particular, it is a goal of the present invention to procure, in at least one embodiment, a technique of this kind that enables the total separation of the active particulate material from the water treated.

It is another goal of the invention to implement, in at least one embodiment, a technique of this kind that makes it possible to ensure high stability of the water treatment process. In particular, the invention pursues the goal of maintaining, throughout the water treatment process, an appreciably constant concentration of active particulate material.

It is yet another goal of the invention to provide, in at least one embodiment of the invention, a technique of this kind that makes it possible to increase productivity. In particular, the invention aims to reduce idle times during which the production of the treated water is stopped.

The invention is also aimed at providing, in at least one embodiment, a technique of this kind that makes it possible to limit the degradation of the active particulate material, for example as beads or grains.

It is also a goal of the invention, in at least one embodiment, to procure a technique of this kind that seeks to reduce the operating costs inherent in potabilizing or making water drinkable, especially by the absence of the use of coagulant and/or flocculent reagents.

It is yet another goal of the invention, in at least one embodiment, to provide a technique of this kind that is reliable and efficient, and has a relatively small impact on the environment, especially because of the absence of the use of coagulant and/or flocculent reagents.

4. SUMMARY OF THE INVENTION

These goals, as well as others that shall appear here below, are attained according to the invention by means of a method for treating water charged with pollutant matter with a view to potabilizing it and/or purifying it, said method comprising:
- a step for eliminating consisting in putting said water charged with pollutant matter into contact, within a stirred contact tank, with an active particulate material according to a predetermined concentration of active particulate material in said water;
- a step for extracting consisting in continuously extracting, from said contact tank, a mixture constituted by water and active particulate material;
- a step for separating consisting in continuously separating said active particulate material.

Said step for continuously separating consists in:
- introducing said mixture into a rotating filter drum,
- filtering said mixture through said rotating filter drum so as to trap said active particulate material inside said drum,
- recovering filtered water outside said drum, in its lower part, and, and
- discharging said filtered water.

Said method also comprises steps for washing said rotating filter drum, said steps for washing comprising in:
- counter-current injecting of a constant given volume of filtered water under pressure, forming wash water, on the external surface of an upper part of said filter drum to detach the residues accumulated inside it, and,
- recovering said wash water and said residues inside said filter drum without putting them into contact with said mixture introduced inside said filter drum;

said steps for washing being implemented according to a predetermined cycle.

Said wash water and said residues recovered during said steps for washing are stored momentarily in a recirculation tank, stirred and then sent back essentially in their totality into said contact tank so as to keep said predetermined concentration in active particulate material essentially constant in said contact tank.

Thus the invention relies on an original approach which, in a technique for potabilizing or making water drinkable, including a putting of water to be treated in contact with an active particulate material, consists in separating the active particulate material from the treated water by means of a rotating filter drum.

As understood in the invention, a filter drum is a hollow element of a generally cylindrical shape, the walls of which, demarcating its external surface, are at least partly porous. Stating that such a filtering drum has a generally cylindrical shape signifies that it is cylindrical or capable of being inscribed within a cylinder.

The use of a stirred tank in which the water to be treated is put into contact directly with active particulate material makes it possible to increase the contact between these two elements and improve the efficiency of the treatment while at the same time limiting its duration.

The fact of introducing the mixture of water to be treated and active particulate material into said filtering drum makes it possible, when it is put into rotation, to integrally separate the active particulate material, which remains trapped inside the drum, from the treated water which flows outside the drum through the pores that pass through it.

The treated water collected at the outlet of the filtering drum is thus totally free of active particulate material. This contributes to preventing the clogging of filtering units which could be placed downstream so as to eliminate the residual turbidity of the treated water produced.

This technique therefore makes it possible both to improve the contact between the water to be treated and the active particulate material and prevent losses of this material.

The washing of the drum makes it possible to recover the totality of the active particulate material while at the same time continuing the filtering of the water through the drum. This implementation therefore makes it possible to avoid idle times and increase productivity.

The mixture of wash water and active particulate material is recirculated essentially in its totality in the stirred contact tank so that the concentration in active particulate material inside this tank is kept constant. This guarantees the stability of the treatment of the water and reduces the costs inherent in the consumption of active particulate material.

Furthermore, the cleaning of the drum with water under pressure does not necessitate the use of cleaning solution. This limits the impact of the potabilizing of water on the environment.

The washing of the drum is implemented according to a predetermined cycle. The steps for washing can for example be implemented according to a predetermined frequency, or else whenever the maximum level of water in the drum is reached or again whenever the maximum threshold of clogging of the drum is reached or again in taking account of two or three of these items of information.

Said active particulate material preferably has a grain size of 20 micrometers to 500 micrometers and advantageously a coefficient of uniformity of 1.0 to 1.5. Preferably, the coefficient of uniformity will range from 1 to 1.2.

Preferably, said active particulate material has a grain size equal to 350 micrometers.

The coefficient of uniformity is equal to the ratio between the mesh aperture size of a screen enabling the passage of 60% of particles of a given size and the mesh aperture size of a screen enabling the passage of 10% of said particles. The closer the coefficient of uniformity of an active particulate material is to 1, the greater the extent to which this material is monodispersed, i.e. the lower is the dispersion of the size of the particles that constitute it. Inversely, the greater the distance of the coefficient of uniformity of active particulate material from 1, the greater the extent to which this material is heterodispersed, i.e. the greater is the dispersion of the size of the particles that constitute it.

The fact, according to the invention, of using an active particulate material, the coefficient of uniformity of which is from 1 to 1.5 and preferably from 1 to 1.2 makes it possible to ensure that the size of the particles that compose it varies very little. It is thus possible to use a filter drum with a higher cut-off threshold. This limits the clogging of the filter drum and reduces the frequency of the steps for cleaning it.

The fact of using an active particulate material, for which the size of the particles is greater than or equal to 20 micrometers make it possible to ensure a gravitational filtering of the mixture of water and active particulate material through the filter drum. This makes it possible to avert the use of a pump to force this mixture to go through the pores of the filter drum.

According to an advantageous characteristic, a method according to the invention comprises purges of saturated active particulate material from said recirculation tank in order to eliminate them or regenerate them and inputs of supplements of fresh and/or regenerated active particulate material in said contact tank, the quantities of said purges being essentially identical to the quantities of fresh and/or regenerated active particulate material.

When the active particulate material is saturated, it is no longer efficacious so that it has to be replaced by a fresh and/or regenerated active particulate material. The saturated active particulate material is then extracted from the recirculated tank, and then an equal quantity of fresh and/or regenerated active particulate material is injected into the stirred contact tank. This makes it possible to preserve a constant concentration in active particulate material inside the stirred contact tank and thus ensure the stability of the treatment.

Fresh active particulate material is material that has never been used. Regenerated active particulate material is material that has already been used to treat water and, after that, has been reactivated so as to recover, in great part, its original active properties.

Preferably, the purges of active particulate material consist in continuously extracting a small quantity of saturated or non-saturated active particulate material from the recirculation tank. At the same time, an identical quantity of fresh and/or regenerated material is introduced into the contact tank. The quantities brought into play depend on the operating conditions.

According to a preferred characteristic, a method according to the invention comprises a step of in-situ regeneration of said saturated active particulate material.

Certain saturated active particulate materials can be regenerated directly within the installation used to implement the method. They are for example ion-exchange resins. The method then comprises a corresponding step for regenerating.

The different types of regeneration implemented are proper to each regenerable active particulate material and are well known to those skilled in the art. If the active particulate material is an ion-exchange resin, the regeneration could for example consist of a co-current regeneration, or a counter-current regeneration.

Certain regeneration techniques are fairly complex so that they cannot be implemented directly within the method according to the invention.

If the active particulate material is active carbon, the regeneration could be implemented off site.

Other active particulate materials as well as other regeneration techniques can of course be implemented.

In this case, said fresh and/or regenerated active particulate material input into said contact tank during said input step comes from said step of in-situ regeneration of said saturated active particulate material.

Preferably, said discharged filtered water then undergoes a final filtering step aimed at reducing its residual turbidity.

Said final filtering is advantageously a classic filtering on a granular filtering medium such as sand.

Its implementation significantly reduces turbidity and possible fines resulting from the attrition of the beads or grains of active particulate material.

Said final filtering is advantageously a membrane filtration In this case, said membrane filtration is an ultrafiltration.

Its implementation significantly or even totally reduces turbidity, viruses, bacteria and possible fines resulting from the attrition of the grains or beads of active particulate material.

5. LIST OF FIGURES

Other features and advantages of the invention shall appear more clearly from the following description of preferred embodiments, given by way of simple illustrative and non-restrictive examples and from the appended drawings, of which.

6. DESCRIPTION OF ONE EMBODIMENT OF THE INVENTION

6.1 Reminder of the Principle of the Invention

The general principle of the invention consists, in a potabilization and/or purification technique in which water to be treated is put into contact with an active particulate material, in separating the active particulate material from the water treated by means of a rotary filter drum.

The fact of putting the water to be treated into direct contact with active particulate material in a stirred tank makes it possible to improve the efficiency of the treatment while at the same time limiting its duration.

The implementing of a filter drum enables the total separation of the active particulate material, which remains trapped inside the drum, from the treated water which flows outside the drum through the pores that pass through it.

This prevents the loss of active particulate material in the treated water and the clogging of the filtering units which can be placed downstream.

The washings of the drum consists of the counter-current injection of filtered water under pressure, forming wash-water, on the external surface of an upper part of said filter drum to detach the residues that have collected inside it, and to recover said wash-water and said residues inside said filtering drum without placing them in contact with said mixture introduced into the interior of said filter drum. These washings there do not require the stopping of production, and this averts idle times and increases productivity.

Furthermore, these washing operations enable the recovery of the totality of the active particulate material. The mixture of wash water and active particulate material is then recirculated essentially in its totality, i.e. almost totally, in the stirred contact tank so that the concentration in active particulate material inside this tank is kept constant. This ensures the stability of the treatment of the water and reduces the costs inherent in the consumption of active particulate material.

In addition, the cleaning of the drum with water under pressure does not necessitate the use of cleansing solution. This limits the impact on the environment of the potabilizing of the water.

6.2 Example of an Installation According to the Invention

6.2.1 Case of an Active Particulate Material Regenerable In Situ

Figure 1:
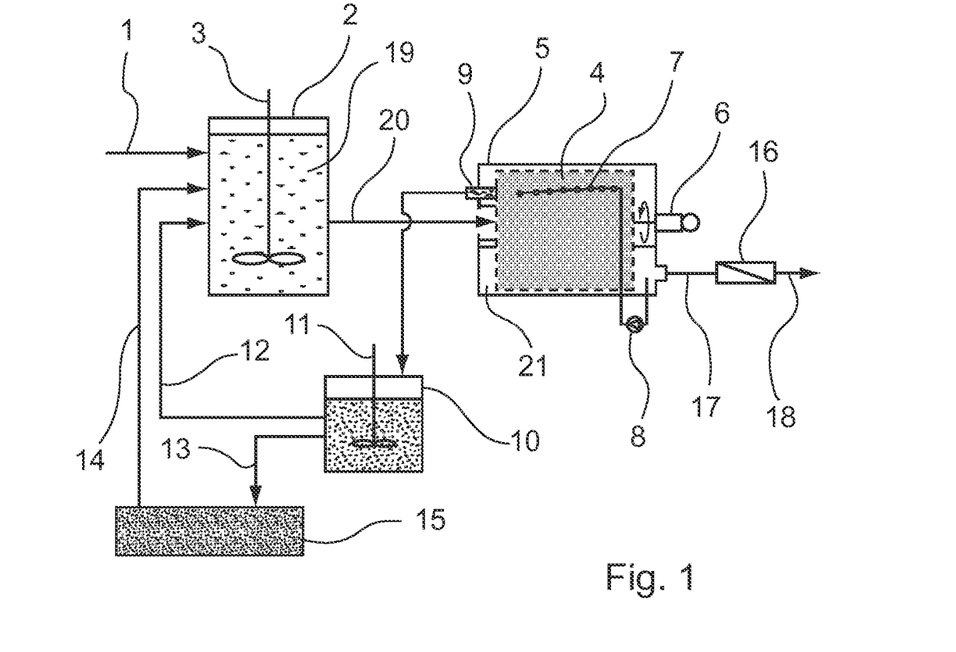
FIG. 1 illustrates an installation for implementing a method according to the invention implementing an active particulate material regenerable in situ.

Referring to FIG. 1, we present an embodiment of a water treatment installation according to the invention.

Such an installation comprises a piping 1 for the intake of water to be treated. This piping opens into a contact tank 2, housing a stirring means 3, for example a stirrer within which the water to be treated is put into contact with an active particulate material 19 regenerable in situ.

The contact tank 2 has an outlet connected to a piping 20 which opens into a filter drum 4.

The filter drum 4 has the shape of a hollow cylinder, the external surface of which is porous. In this embodiment, the external surface of the filter drum is constituted by a screen. The diameter of the pores of the screen are chosen so that they make it possible to retain the active particulate material with which the water to be treated is put into contact.

The filter drum 4 is mounted rotationally inside a chamber 5. A motor 6 is capable of driving the filter drum 4 in rotation.

A chute 9 is housed inside the filter drum 4 in an upper part of it.

A water injection bar 7 comprising nozzles is housed outside the filter drum 4 in proximity to its external surface. It approximately faces the chute 9.

The injection bar 7 is connected to the bottom of the chamber 5 containing treated water 21 by a piping on which there is mounted a pump 8. Control means (not shown) make it possible to activate the pump 8 according to an adjustable predetermined frequency. In this case, a wash cycle of the drum could be implemented according to a predetermined frequency.

In one variant, an installation according to the invention could include an "all-or-nothing sensor" comprising two electrodes placed at the entry to the drum. The resistance between these two electrodes could be measured in order to determine whether the maximum of water in the drum, defined by the height of the sensor, has been reached. A wash cycle of the drum could, in this case, be triggered each time that the maximum level of water in the drum is reached.

According to yet another variant, an installation according to the invention could comprise a piezoelectric type analog sensor to determine the level of clogging of the drum. A wash cycle of the drum could in this case be triggered each time that a maximum threshold of clogging of the drum is reached.

The chute 9 is connected by means of a piping 9 to a recirculation tank 10 housing a stirring means 11, for example a stirrer.

A recirculation piping 12 connects the recirculation tank 10 to the contact tank 2.

A piping for extracting saturated active particulate material 13 connects the recirculation tank 10 to a regeneration unit 15.

The regeneration unit 15 is connected to the contact tank 2 by means of a piping for regenerated active particulate material 14.

The bottom of the chamber 5 has an outlet for discharging treated water which is connected via a piping 17 to a filtering unit 16.

The filtering unit 16 has an outlet connected to a piping for discharging treated and filtered water 18.

6.2.2 Case of an Active Particulate Material Non-Regenerable In Situ

Figure 2:
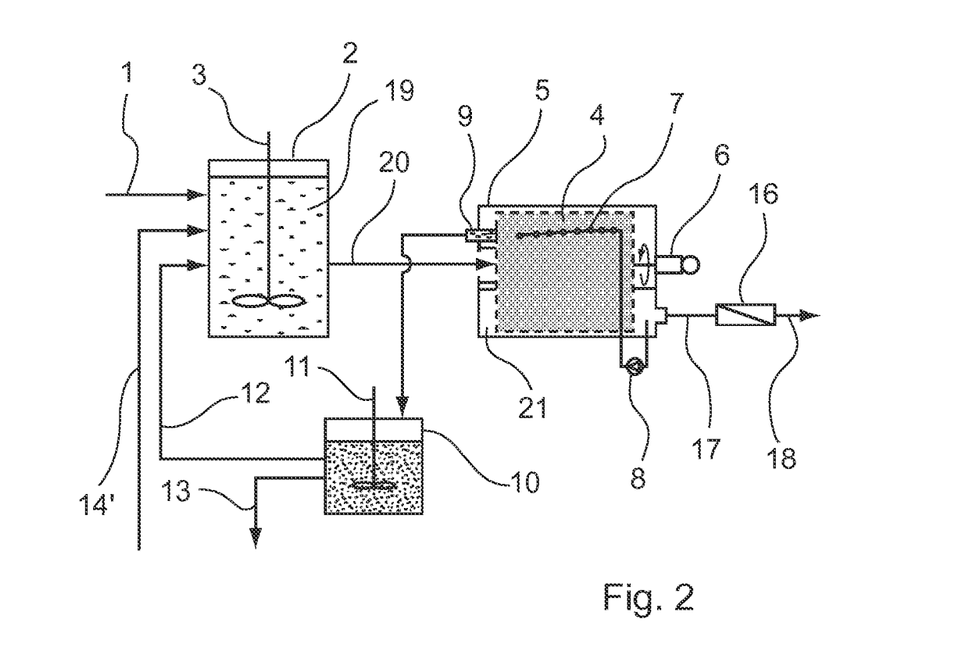
FIG. 2 illustrates an installation for implementing a method according to the invention implementing an active particulate material non-regenerable in situ.

FIG. 2 illustrates a variant of a treatment installation according to the invention that is to be implemented when the active particulate material injected inside the contact tank 2 is not regenerable in situ.

In this case, no regeneration unit is implemented in situ. The piping 13 for extracting saturated active particulate material 13 then opens into a zone for elimination or treatment ex-situ. The plant then comprises a piping 14' of fresh or regenerated active particulate material which opens into the contact tank 2.

6.2.3 Variant

Figure 3:
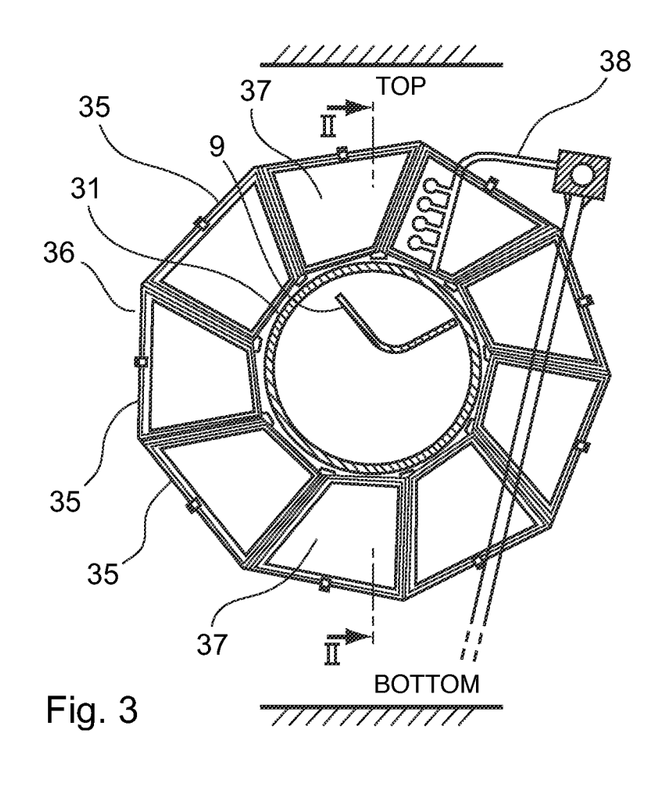
FIGS. 3 and 4 illustrate a variant of a filter drum implementing one of the filtering disks.
Figure 4:
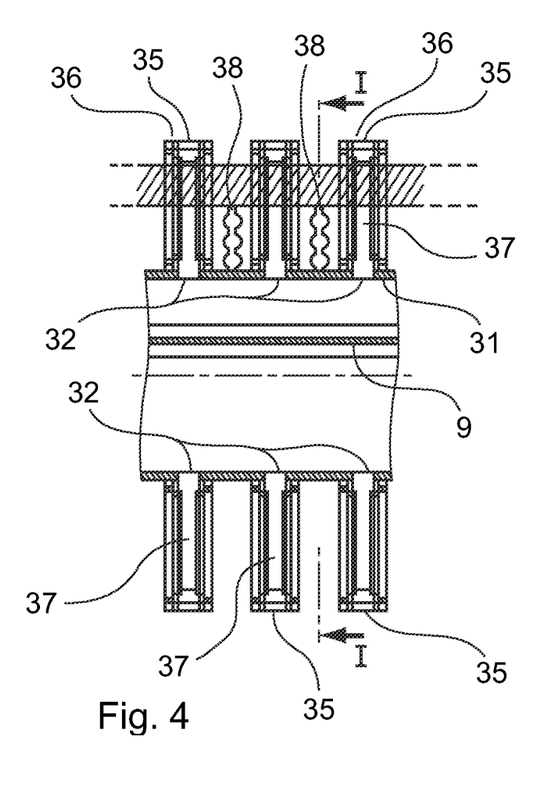

FIGS. 3 and 4 illustrate a variant of a filter drum according to the invention.

According to this variant the filter drum comprises a tube 31, the surface of which is traversed by perforations 32 distributed so that they form rings that are distant from one another around the periphery of the tube 31.

Disk portions 35 are attached all around certain of the rings to form filter disks 36 which are fixedly joined to the tube 31. Each of the disk portions 35 constitutes a frame that houses filtering elements 37. In this way, water introduced into the tube 31 flows through the perforations 32 up to the disk portions 35 and exits therefrom while the impurities that it contained remain trapped in the filtering elements 37 that they bear.

Water injection bars 38 are placed in proximity to the external surface of the disks 35, in an upper part of the filter drum.

In this embodiment, the filter disks 36 show a polygonal type external outline. The injection bars are mounted so as to be rotationally mobile along an axis parallel to the axis of rotation of the drum. They can thus be driven by a to-and-fro motion synchronized with the rotation of the disks 36 in order to cover the total surface area of the disk portion 35.

A chute 9 is housed inside the filter drum beneath the injection bars 38.

6.3 Example of a Method According to the Invention

6.3.1 Case of an Active Particulate Material Regenerable In Situ

A method of treatment according to the invention is now described with reference to FIG. 1.

A given volume of water to be treated in order to be potabilized, preliminarily decanted, is introduced continuously into the contact tank 2 by means of the piping 1. The water is mixed therein by means of stirring means 3 with an active particulate material regenerable in situ according to a given concentration. The fact that the concentration in active particulate material in the contact tank 2 is essentially constant provides for better stability and a better control over the treatment of the water. The water to be treated then undergoes a step for eliminating in which the target pollutant or pollutants are eliminated.

In this embodiment, the active particulate material is constituted by ion-exchange resins 19 having a grain size equal to 350 micrometers and a coefficient of uniformity equal to 1.2.

The mixture of water and ion-exchange resins contained in the contact tank 2 is introduced into the filter drum 4, essentially beneath its axis of rotation, by means of the piping 20.

The size of the pores of the screen of the filter drum 4 is chosen so that it makes it possible to retain the totality of active particulate material. The filter drum 4, driven by a rotational motion by means of the motor 6, therefore makes it possible to filter this mixture and separate the water and the ion-exchange resins.

The ion-exchange resins are trapped by the screen of the filtering drum 4 and remain inside it, while the treated water 21, free of active particulate material, flows through the pores of the screen into the bottom of the chamber 5.

The treated water 21 is conveyed via the piping 17 into a filtering unit 16 so as to reduce its residual turbidity. The treated and filtered water is then discharged via the piping 18.

The filtering unit 16 is a membrane filtering unit, for example of the ultrafiltration type. Its use enables the significant and even the total reduction of the turbidity, the viruses, the bacteria and possible fines resulting from the attrition of the ion-exchange resins.

In one variant, the filtering unit could be a unit for filtering on media, such as for example sand. Its use enables the significant reduction of the turbidity and possible fines resulting from the attrition of the ion-exchange resins.

As and when the mixture of water and ion-exchange resins is filtered into the filtering drum 4, this drum is clogged by the ion-exchange resins. At the end of each treatment cycle, a washing step is implemented. As understood in the invention, a treatment cycle starts as soon a given volume of water to be treated is introduced into the contact tank 2, and finishes as soon as the given volume of water to be treated has undergone an elimination in the contact tank 2; and then a filtering in the filter drum 4. In this embodiment, the steps for washing are activated according to a predetermined frequency corresponding approximately to the duration of a cycle. In one variant, they could be activated each time that the maximum level of water that could be present in the filtering drum is reached or as soon as a predetermined threshold of maximum clogging of the drum is reached.

Such a step of washing consists in injecting, under pressure, a constant volume of treated water 21 in a counter current to the external surface of the filter drum 4. To this end, the pump 8 is implemented so as to draw treated water 21 from the bottom of the chamber 5 and inject it via bar the 7 on to the external surface of the filter drum 4. The ion-exchange resins that have collected on the inner surface of the filter drum 4 gets detached from it. A mixture of wash water and ion-exchange resins gets shed into the chute 9. It is therefore not put into contact with the mixture of water and active particulate material introduced into the filter drum 4 via the piping 20.

At the end of the washing step, the totality of the ion-exchange resins which had collected inside the filter drum 4 during the treatment cycle have got detached from it.

The mixture of wash water and ion-exchange resins gets shed from the chute 9 into the recirculation tank 10.

The concentration in ion-exchange resins in the contact tank 2 is constant. A new washing step is triggered after each treatment cycle, i.e.; after a constant given volume of water has been treated. The quantity of water used during each washing step is constant. A washing enables the recovery of the totality of the ion-exchange resins trapped in the filter drum 4 during a treatment cycle. The concentration of ion-exchange resins in the recirculation tank 10 is therefore constant.

The mixture of wash water and ion-exchange resins contained in the recirculation tank 10 at the end of the washing is essentially, in its totality, reinjected into the contact tank 2 throughout the following treatment cycle.

It must be noted that a new treatment cycle is implemented at the beginning of each washing step. Indeed, the mixture of water and ion-exchange resins is filtered at the bottom of the filter drum 4 while its washing is done at its top part. In other words, the production of water is not stopped during the steps for washing. Besides, the fact that the drum is essentially cylindrical and rotary improves the efficiency of the washing and therefore reduces its duration and the quantity of water needed to implement it. The washing therefore gives rise to no addition or any loss of water.

The saturated ion-exchange resins contained in the recirculation tank 10 are extracted therefrom by the implementation of purges by means of the piping 13. These saturated ion-exchange resins conveyed into the regeneration unit 15 in order to be regenerated.

The ion-exchange resins can for example be regenerated within the regeneration unit 15 in the following way.

The regeneration unit 15 comprises a accumulation tank (not shown) in which the saturated ion-exchange resins are conveyed from the recirculation tank 10. The accumulation tank comprises, at its base, a filtering screen. The ion-exchange resins therein are stored, concentrated and collected in the course of time (filtering of the interstitial water through the filtering screen to concentrate the exchanging resins).

After a duration predetermined by the operator, corresponding to the accumulation of a known quantity of ion-exchange resins, the mixture of water and resins, which is concentrated, is oriented towards a reaction tank; also equipped with a filtering screen in its lower part.

The regeneration of the ion-exchange resins proper is then initiated.

At an initial stage, the volume (or bed) of accumulated ion-exchange resins is measured.

At a second stage, a regeneration solution is introduced into the reaction tank. The injected volume of regeneration solution is generally a function of the volume of ion-exchange resins to be regenerated. The regeneration solution is prepared prior to the regeneration step within a preparation tank (preparation done to the desired concentration using water from the mains supply and a concentrated regeneration solution).

A percolation of the regeneration solution through the bed of ion-exchange resins then takes place at a fixed flow rate.

Used brine is then drawn from the reaction tank and discharged towards the drains or kept in order to be re-utilized.

The ion-exchange resins are then rinsed with water from the mains supply with this water being percolated through the bed of resins at a fixed flow rate.

The rinsing water is drawn off and discharged towards a subsequent appropriate treatment.

The regenerated ion-exchange resins are then recovered. The are mixed with water from the mains supply so as to form a slurry. A certain quantity of fresh ion-exchange resins can be integrated into the barbotine.

The regenerated ion-exchange resins in barbotine form coming from the regeneration unit 15 are injected into the contact tank 2 through the piping 14. The quantity of saturated ion-exchange resins extracted from the recirculation tank 10 is appreciably equal to the quantity of regenerated ion-exchange resins introduced into the contact tank 2 via the piping 14. Thus, the concentration of ion-exchange resins within the contact tank 2 is kept constant.

The washing of the drum is obtained efficiently without addition of any chemical washing product. Besides, the treatment of the water does not necessitate the use of coagulant. Furthermore, the fact of implementing a filtering drum averts the implementation of a decantation step which most often makes it necessary to inject polymer into the mixture of water and active particulate material in order to facilitate its decantation. The technique according to the invention therefore has a limited impact on the environment.

The prior art separation techniques most often require that the active particulate material be concentrated in the collecting tank after it has been separated from the treated water and then reinjected into the contact tank. According to the invention, the implementation of the filtering drum makes it possible to directly obtain a mixture of wash water and active particulate material that is highly concentrated in active particulate material (approximately between 200 ml and 500 ml of active particulate material per liter of mixture). The invention therefore forestalls the implementing of a step of concentration, thus making it possible to reduce the duration of treatment and increase productivity.

6.3.2 Case of an Active Particulate Material Non-Regenerable In Situ

A method of treatment according to the invention is now described with reference to FIG. 2.

Only the differences between the method described with reference to FIG. 1 and the method described with reference to FIG. 2 are described here below.

In this embodiment, the active particulate material implemented is not regenerable in situ. It is constituted by granular activated carbon (GAC).

In this case the saturated GAC contained in the recirculation tank 10 is extracted from it by the implementing of the purges by means of the piping 13. This saturated CAG is conveyed towards an ex-situ treatment zone, i.e. situated outside the plant used to implement the method. Fresh GAC is injected into the contact tank 2 via the piping 14. The quantity of saturated GAC extracted from the recirculation tank 10 is appreciably equal to the quantity of fresh GAC introduced into the contact tank 2 via the piping 14. Thus, the concentration in GAC inside the contact tank 2 is kept constant.

6.3.3 Variant

Different types of adsorbent particulate materials, regenerable or non-regenerable in situ, can be implemented such as, for example, ion-exchange resins, CAG, PAC (powdered activated carbon), composite particles etc.

The methods described with reference to FIGS. 1 and 2 can be implemented within an installation in which the filter drum comprising a screen could be replaced by a filter drum such as the one described here above with reference to FIGS. 3 and 4.

In this case, the washing of the drum consists in injecting treated water in a counter current against the external surface of the disks 36 by means of the bars 38. The mixture of wash water and active particulate material is then collected in the chute 9.

The techniques according to the invention which have been described can be implemented to treat water to potabilize it and/or to purify it.

The invention claimed is:

1. A method for treating water comprising:
   (a) introducing the water containing one or more pollutants to a first receptacle containing a concentration of ion-exchange resins to facilitate removal of pollutants;
   (b) mixing the ion-exchange resins with the water inside the first receptacle, and utilizing the ion-exchange resins to remove one or more pollutants from the water inside the first receptacle;
   (c) passing the mixture of the water and the ion-exchange resins to a rotating drum filter;
   (d) using the rotating drum filter to separate the ion-exchange resins from the water;
   (e) passing the separated water through one or more membrane filtering units and filtering the water therein;
   (f) backwashing the rotating drum filter, and collecting a resulting mixture of ion-exchange resins and backwash;
   (j)
   (k) directing the ion exchange and backwash mixture from the rotating drum filter to a recirculation tank and purging some of the resin from this tank;
   (l) directing the ion exchange resin and backwash mixture from the recirculation tank into the first receptacle and mixing the ion exchange resin and backwash mixture with the water in the first receptacle;
   (m) adding regenerated ion exchange resin or fresh ion exchange resin to the first receptacle such that the amount of regenerated ion exchange resin and fresh ion exchange resin added to the first receptacle is generally equal to the amount of ion exchange resin purged from the recirculation tank; and
   (n) maintaining the concentration of ion exchange resin in the first receptacle generally constant.

2. The method of claim 1, wherein the ion-exchange resins have a grain size of 20 to 500 micrometers.

3. The method of claim 1, wherein the ion-exchange resins have a coefficient of uniformity of approximately 1.0 to approximately 1.5.

4. The method of claim 1, wherein the water passed to the one or more membrane filtration units is substantially free of ion-exchange resins.

5. The method of claim 4, wherein the one or more membrane filtration units are ultrafiltration.

6. The method of claim 1, wherein the rotating drum filter is rotated so at least some of the separated ion-exchange resins are disposed at the top of the rotating drum filter, and directing the backwash at an upper portion of the rotating drum filter so as to dislodge the ion-exchange resins from the rotating drum filter.

7. The method of claim 1, wherein the mixture of the ion-exchange resins and backwash is collected at the bottom of the rotating drum filter.

8. The method of claim 1, wherein the backwashing is performed without aid of a cleaning solution.

9. The method of claim 1, wherein:
   (a) the concentration of the ion-exchange resins in the first receptacle remains generally constant;
   (b) the ion-exchange resins have a grain size of 20 to 500 micrometers, and the ion-exchange resins have a coefficient of uniformity of approximately 1.0 to approximately 1.5;
   (d) the water that is passed through the one or more membrane filtering units is substantially free of ion-exchange resins;
   (e) the one or more membrane filtration units are ultrafiltration; and (f) the rotary filter is rotated so at least some of the ion-exchange resins are disposed at the top of the rotary filter, and the backwash is directed at an upper portion of the rotary filter so as to dislodge the ion-exchange resins from the rotary filter.

10. The method of claim 1, wherein the process is a continuous process.

11. The method of claim 1 wherein the ion exchange resin in the ion exchange resin and backwash mixture has a concentration of 200-500 ml of ion exchange resin per liter of mixture.

12. A method for treating water comprising:
(a) introducing the water containing one or more pollutants to a first receptacle containing a concentration of granular activated carbon to facilitate removal of pollutants;
(b) mixing the granular activated carbon with the water inside the first receptacle, and utilizing the granular activated carbon to remove one or more pollutants from the water inside the first receptacle;
(c) passing the mixture of the water and the granular activated carbon to a rotating drum filter to separate the granular activated carbon from the water;
(d) passing the separated water through one or more membrane filtering units and filtering the water therein;
(e) backwashing the rotating drum filter, and collecting a resulting a resulting mixture of granulated activated carbon and backwash;
(f) directing the granulated activated carbon and backwash mixture from the rotating drum filter to a recirculating tank, and purging some of the granular activated carbon from this tank;
(g) directing the granular activated carbon and backwash mixture from the recirculation tank into the first receptacle and mixing the granular activated carbon and backwash mixture with the water in the first receptacle;
(h) adding regenerated granular activated carbon or fresh granular activated carbon to the first receptacle such that the amount of regenerated granular activated carbon and fresh granular activated carbon added to the first receptacle generally equals to the amount of granular activated carbon purged from the recirculation tank; and
(i) maintaining the concentration of the granular activated carbon in the first receptacle generally constant.

13. The method of claim 12, wherein the water passed to the one or more membrane filtration units is substantially free of granular activated carbon.

14. The method of claim 13, wherein the one or more membrane filtration units are ultrafiltration.

15. The method of claim 12, wherein the rotating drum filter is rotated so at least some of the separated granular activated carbon is disposed at the top of the rotating drum filter, and directing the backwash at an upper portion of the rotating drum filter so as to dislodge the granular activated carbon from the rotating drum filter.

16. The method of claim 12, wherein the mixture of granular activated carbon and backwash is collected at the bottom of the rotating drum filter.

17. The method of claim 12, wherein the backwashing is performed without the aid of a cleaning solution.

18. The method of claim 12 wherein the granular activated carbon in the ion exchange resin and backwash mixture has a concentration of 200-500 ml of ion exchange resin per liter of mixture.

19. A method for treating water comprising:
(a) continually introducing the water containing one or more pollutants to a first receptacle containing a concentration of ion-exchange resins to facilitate removal of pollutants;
(b) continually mixing the ion-exchange resins with the water inside the first receptacle, and utilizing the ion-exchange resins to remove one or more pollutants from the water inside the first receptacle;
(c) continually passing the mixture of the water and the ion-exchange resins to a rotating drum filter;
(d) using the rotating drum filter to continually separate the ion-exchange resins from the water;
(e) continually passing the separated water through one or more membrane filtering units and further filtering the water therein;
(f) continually backwashing the rotating drum filter, and continually collecting the resulting mixture of ion-exchange resins and backwash;
(g) continually directing the ion exchange and backwash mixture from the rotating drum filter to a recirculation tank continuously purging some of the ion exchange resin from the this tank;
(h) continually directing the ion exchange resin and backwash mixture from the recirculation tank into the first receptacle and mixing the ion exchange resin and backwash with the water in the first receptacle;
(i) adding regenerated ion exchange resin or fresh ion exchange resin to the first receptacle such that the amount of regenerated ion exchange resin and fresh ion exchange resin added to the first receptacle is generally equal to the amount of ion exchange resin purged from the recirculation tank; and
(j) maintaining the concentration of ion exchange resin in the first receptacle generally constant.

* * * * *